United States Patent
Pratt et al.

(10) Patent No.: US 6,171,038 B1
(45) Date of Patent: Jan. 9, 2001

(54) TAPERED SHANK RIVET

(75) Inventors: John D. Pratt, Laguna Niguel; Soheil Eshraghi, Irvine, both of CA (US)

(73) Assignee: Textron Inc., Providence, RI (US)

( * ) Notice: Under 35 U.S.C. 154(b), the term of this patent shall be extended for 0 days.

(21) Appl. No.: 09/399,887

(22) Filed: Sep. 21, 1999

Related U.S. Application Data

(60) Provisional application No. 60/108,103, filed on Nov. 12, 1998.

(51) Int. Cl.[7] .............................. F16B 13/04; F16B 13/06
(52) U.S. Cl. .................. 411/43; 411/55; 411/70
(58) Field of Search .................. 411/43, 55, 69, 411/70, 501, 399

(56) References Cited

U.S. PATENT DOCUMENTS

| | | |
|---|---|---|
| 3,975,786 | 8/1976 | Gapp et al. . |
| 4,012,984 | 3/1977 | Matuschek . |
| 4,037,771 | 7/1977 | Peterson . |
| 4,170,920 | * 10/1979 | Siebol ................. 411/43 |
| 4,177,710 | 12/1979 | Matuschek et al. . |
| 4,897,004 | * 1/1990 | Norton ................. 411/43 |
| 4,904,133 | 2/1990 | Wright . |
| 4,936,725 | 6/1990 | Eshraghi . |
| 4,969,785 | 11/1990 | Wright . |
| 5,046,348 | 9/1991 | Pratt . |
| 5,098,240 | 3/1992 | Gapp et al. . |
| 5,102,274 | 4/1992 | Norton et al. . |
| 5,152,648 | 10/1992 | Pratt . |
| 5,286,151 | 2/1994 | Eshraghi . |
| 5,333,980 | 8/1994 | Pratt et al. . |
| 5,689,873 | * 11/1997 | Luhm ................. 411/43 X |
| 5,690,459 | 11/1997 | Donovan et al. . |

* cited by examiner

*Primary Examiner*—Neill Wilson
(74) *Attorney, Agent, or Firm*—Trexler, Bushnell, Giangiorgi, Blackstone, & Marr, Ltd.

(57) ABSTRACT

An improved method of blind riveting and an improved blind rivet have been described. The blind rivet of the present invention includes an interference fit shank portion which ensures adequate hole-fill and produces work hardening in a work piece. The blind rivet of the present invention also produces a drawing effect, reducing the force necessary to securely seat the rivet in a hole.

12 Claims, 3 Drawing Sheets

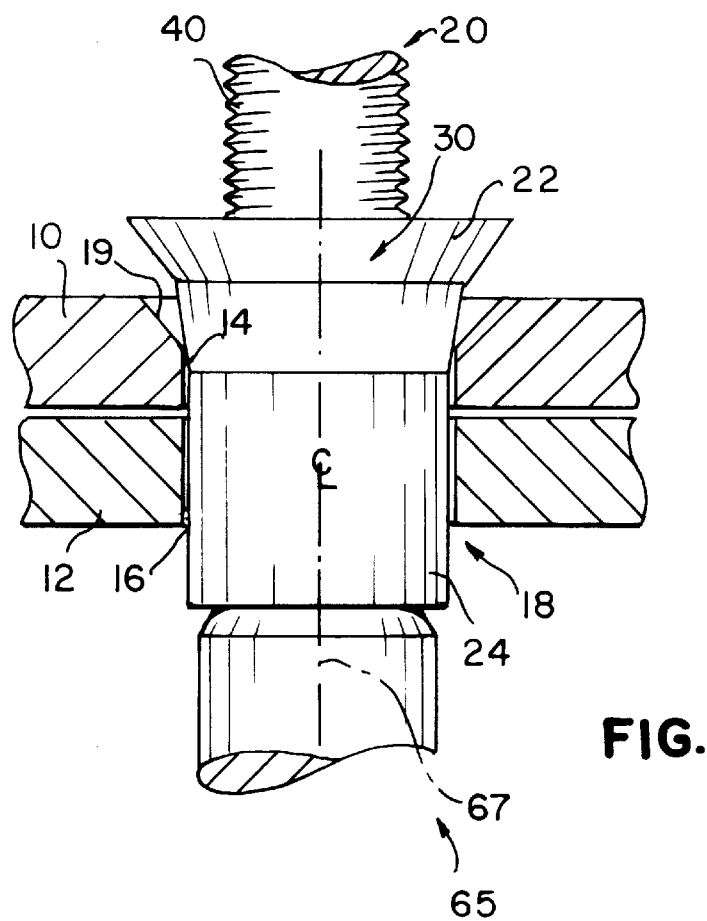
FIG. IA
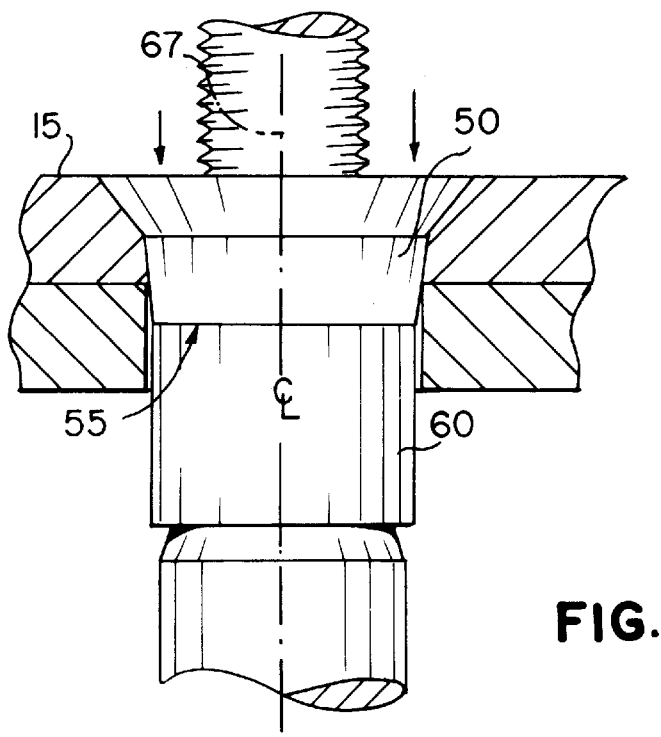
FIG. IB

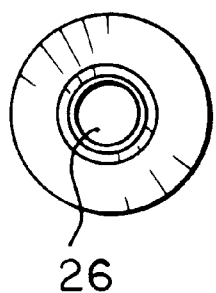
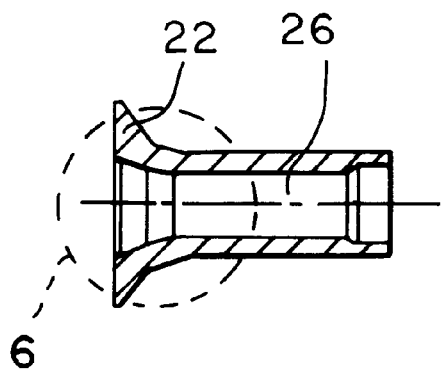
FIG. 5
FIG. 4
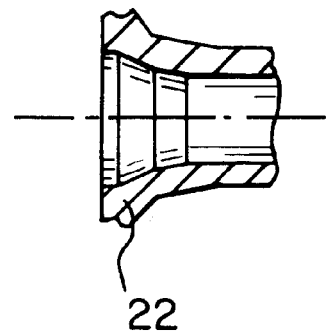
FIG. 6

TAPERED SHANK RIVET

CROSS-REFERENCE

This application claims the benefit of domestic priority of co-pending U.S. Provisional Application Ser. No. 60/108,103 filed on Nov. 12, 1998.

FIELD OF THE INVENTION

This invention relates to rivets and in particular to a blind rivet having structures which produce improved results.

BACKGROUND

The use of rivets to fasten together two sheets of material is well-known. The sheets of material are provided with apertures or holes which are formed in the sheets when positioned for fastening. The sheets are arranged in overlapping relation so that the apertures are aligned and a rivet is inserted into the aligned holes. The rivet, which generally includes a head and a body portion, is then upset to provide a structural joint between the two sheets of material.

The manner of upsetting the rivet depends on the type of rivet used and in particular on whether the rivet is a solid or blind rivet. Solid rivets are often used in fastening operations where the opposite ends of work pieces which are joined are both accessible. In other words, both the work end and the free end of the rivets are accessible during the fastening operation. Such solid rivets are generally upset at one end; that is, a load is applied to both ends of the rivet to deform the material of the rivet tail to form a structural joint. Typically, the end load on the work side of the rivet must be equal and opposite to the end load deforming the rivet tail.

Blind rivets are generally used in fastening applications in which the far side of the work pieces is inaccessible to the operator and all operations on the rivet occur from one side only; hence, the term "blind." Such applications arise frequently in the aerospace industry, where blind rivets may be used, for example, to attach body panels to an air frame. Blind rivets typically comprise a head, a sleeve or shank extending from the head, with an axially aligned bore extending through the sleeve. A stem is positioned in the axial bore and is adapted for movement inside the bore.

The upsetting of a blind rivet is generally a more complex process than the upsetting of a solid rivet. The blind rivet is inserted into a hole with at least some degree of clearance between an outside surface of a sleeve of the rivet and an inside surface defining the hole. An end load is then applied to a head of the rivet to position the rivet in the hole and retain the rivet in a relatively stationary position. The sleeve is hollow and a stem positioned therein is drawn axially upwardly through the sleeve. The stem has a portion which has an outside diameter which is greater than the inside diameter of the sleeve to expand the sleeve radially outward at the distal or "blind" end. Expansion of the blind end forms a bulbed head at the blind end of the rivet.

During the pulling process, the rivet is retained in the hole while the bulb forms at the blind end. At a predetermined time, the time being related to the forces imposed on the rivet, the stem is broken or separated such that a portion of the stem remains in the sleeve of the rivet and a portion remains in the riveting tool. Alternately, the sleeve and stem may be designed to allow the stem to pull through the sleeve without breaking the stem. This type of rivet is a "pull through" rivet.

The prior art method of blind riveting suffers from a number of problems. A problem which may arise is insufficient engagement between the rivet and the work piece at the juncture of the rivet head and sleeve or shank. Insufficient engagement, commonly termed "poor under-head hole-fill" reduces the strength of the rivet joint and can lead to premature failure of the work piece.

Another problem is that prior art methods may require a considerable force or end load to drive the rivet securely into the work piece. The need to use considerable force may have a number of undesirable consequences. These include reduced life of the riveting apparatus, strain on the operator, and possible damage to the work piece.

A further problem with conventional methods is that they are often inadequate to draw the sheets of material entirely together. Accordingly, gaps are left between the sheets of material. The gaps interfere with the formation of a tight and secure joint. Such gaps are particularly detrimental in the aerospace industry where fuel and gas tight joints are essential. Moreover, moisture may gather in the gaps, which can lead to corrosion and failure.

OBJECTS AND SUMMARY

Accordingly, it is a general object of the present invention to provide an improved method and device for blind riveting.

It is an additional object of the present invention to provide a method and device for blind riveting which improves hole-fill.

It is a related object of the present invention to provide a method and device for blind riveting which improves hole-fill at the head/shank juncture.

It is a further object of the present invention to provide a method and device for blind riveting which increases the strength of the structural joint created.

It is a related object of the present invention to provide a method and device for blind riveting which increases the life of the structural joint and delays the onset of fatigue failure.

Yet another object of the present invention is to provide a method and apparatus for blind riveting which reduces the force or end load necessary to fully drive and seat a rivet in a hole.

An additional object of the present invention is to provide a method and device for blind riveting in which a balance of loads is used to drive and seat a rivet in a hole.

Further objects and advantages will become apparent from the ensuing description.

Accordingly, the present invention provides a method of blind riveting and a blind rivet which improve hole-fill in the region of the head/shank juncture and increase the strength of the rivet joint. The present invention also provides a method of blind riveting and a blind rivet which reduce the force necessary to seat and fully drive the rivet in the hole. A blind rivet according to the invention includes an interference fit shank portion between the head and the generally axially aligned or straight portion of the sleeve. The interference fit shank portion may be tapered or may include a tapered transition between the sleeve and a generally straight interference fit shank portion.

BRIEF DESCRIPTION OF THE DRAWINGS

The present invention will now be described by way of example with reference to the accompanying drawings in which:

FIG. 1A is a front elevational view of a blind rivet according to the present invention being positioned in aligned holes of a work piece;

FIG. 1B is a front elevational view of a blind rivet according to the present invention after it has been driven into the work piece;

FIG. 4 is a side elevational view of a rivet head according to the invention;

FIG. 5 is an end view of a rivet head according to the invention; and

FIG. 6 is an enlarged side elevational view of a rivet head according to the invention.

DETAILED DESCRIPTION OF A PREFERRED EMBODIMENT

Figure 2:
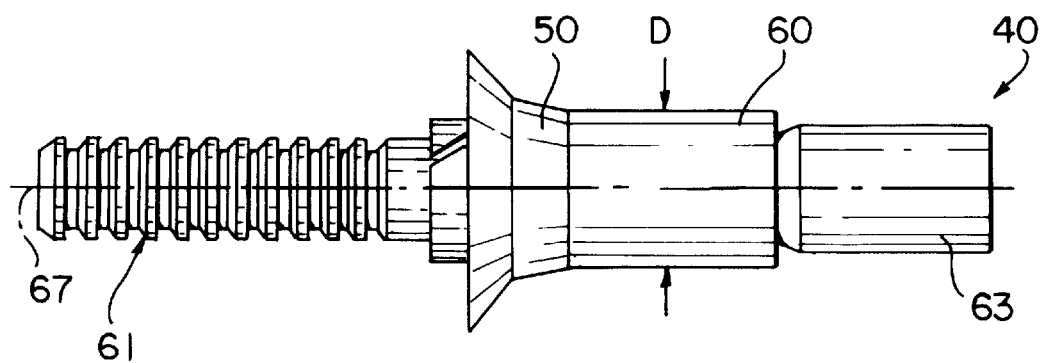
FIG. 2 is a side elevational view of a blind rivet according to the invention, showing the structure of the blind rivet in greater detail.

Reference is now invited to FIGS. 1A and 1B which show a blind rivet assembly according to the invention. Specifically, FIGS. 1A and 1B illustrate the riveting together of a work piece, comprising a pair of panels, sheets, or work pieces 10 and 12, using a blind rivet 20 according to the invention. The work pieces 10, 12 include aligned holes or apertures 14, 16 which form a bore 18 for receiving the blind rivet 20 of the present invention. The holes 14, 16 may be drilled or otherwise suitably formed in the work pieces 10, 12. The bore 18 is preferably substantially straight and cylindrical. A tapered or countersink region 19, however, may be provided in an upper portion of the bore 18 for accommodating a flush type rivet head. Such a tapered or countersink region 19 is shown in FIG. 1A. It will be apparent to those skilled in the art, however, that a radially extending head or protruding head may also be used in the present invention and in that case, the entire bore 18 would be substantially cylindrical.

As shown in FIG. 1A, the rivet 20 is placed in the bore 18 to fasten the work pieces 10, 12 together. The rivet 20 is preferably positioned in the hole 18 with some degree of clearance between the outside of the rivet 20 and the inside of the bore or hole 18. Such clearance facilitates initial placement of the rivet 20 in the hole 18. However, as described below, a portion of the rivet 20 is configured for creating an interference fit with a portion of the hole 18.

The blind rivet 20 of the present invention includes an outer portion 30 and an inner portion 40. The outer portion 30 comprises a rivet head 22 and a sleeve or shank 24 which extends from the head 22. The outer portion 30 defines an axially aligned bore 26 which extends through the sleeve or shank 24 and the head 22 (see FIGS. 4–6). The bore 26 is provided for receiving the inner portion 40 of the rivet 20. The inner portion 40 comprises a rivet stem 61 having a head 63 which is positioned in the axial bore 26 and is displaceable therein.

The construction of the outer portion 30 will now be examined in greater detail. Specifically, first, attention will be directed to the head 22 and then the construction of the shank or sleeve portion 24 will be examined. Accordingly, attention is initially directed to FIGS. 1A, 1B, 4, and 5.

As illustrated, in a preferred embodiment, the head 22 comprises a flush type head. In this regard, the head 22 is generally conical so that it may closely interfit with the work piece countersink surface 19. Such a close interfit allows the top of the rivet head 22 to be flush with the work piece surface 15 after insertion and helps create a secure structural joint. Of course, as mentioned above and discussed below, in the present invention the head 22 may also comprise a radially extending type head or protruding head rivet.

Attention is now invited to FIGS. 1A, 1B and 2 and the shank or sleeve 24 of the present invention. As illustrated, the shank or sleeve 24 extends axially from the head 22. The shank 24 defines first and second shank portions 50, 60 in a lengthwise extending sequence away from the head. The juncture between the first shank portion 50 and second shank portion 60 is generally designated 55.

The first shank portion 50 connects the rivet head 22 to second shank or body portion 60 of the sleeve 24. The body portion 60 of the sleeve 24 is generally axially aligned or straight. The body portion 60 has an outside diameter or tolerance D which is slightly less than the diameter of the bore 18. As discussed above, the difference in diameters provides a degree of clearance and facilitates initial placement of the rivet 20 in the hole 18.

Figure 3:
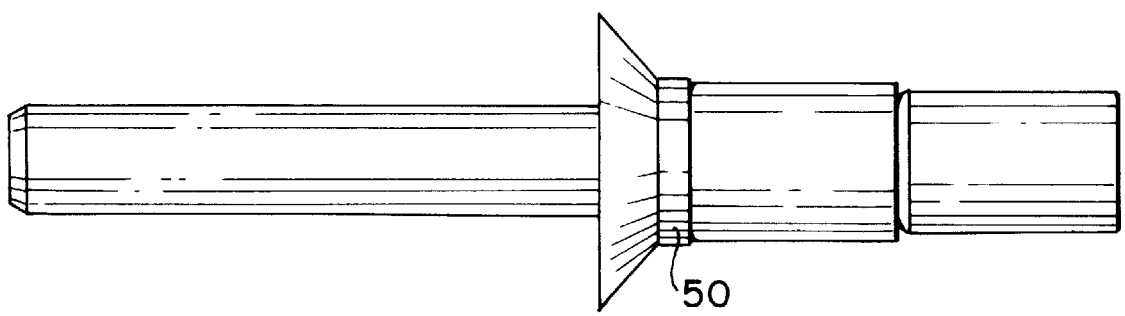
FIG. 3 is a side elevational view of an alternative embodiment of a blind rivet according to the invention.

In contrast, the first or connecting shank portion 50 has a greater diameter than the body portion 60 and the bore 18. The greater diameter of the first or connecting shank portion 50 provides an interference fit between the shank portion 50 and the bore 18. In other words, the shank portion 50 must be forced into the bore 18. In the illustrated embodiment, the shank portion 50 (hereafter to be designated the interference fit shank portion) is tapered. The principles of the present invention, however, also apply to a rivet in which the interference shank portion 50 is generally straight or axially aligned with the axis 67 of the stem 61 (see FIG. 3). In such an embodiment, a tapered transition may be provided between the larger diameter interference shank portion 50 and the smaller diameter shank body portion 60.

The angle of the tapered interference fit shank portion 50 will depend on the particular application in which the rivet 20 is used and the results desired. Preliminary studies, though, suggest that an angle falling within the range from about 3 to about 10 degrees produces desired results. A tapered angle of about 5 degrees was found to be effective. It will be apparent to those skilled in the art that other taper angles, i.e., a different amount of interference could be used, and still produce desired results.

By providing an interference fit shank portion 50 on the rivet sleeve 24, the present invention advantageously ensures that the sleeve 24 will engage the portion of the hole 18 proximate the head 22. Accordingly, the present invention solves the problem of poor under-head hole-fill and its undesirable effects are avoided. That is, by eliminating poor under-head hole-fill, the present invention provides a secure and tight joint of increased static strength and fatigue life. Moreover, because there are no gaps around the head/shank juncture in which fluid can accumulate, the susceptibility to corrosion is reduced.

The present invention provides a further advantage in that the portions of the top work piece 10 are stressed by the interference fit shank portion 50. Specifically, the insertion of the interference fit shank portion 50 compressively stresses the surrounding area of top work piece 10. This, in turn, results in a degree of cold working or work hardening in the top work piece 10. The degree of cold working will depend on the amount of interference between the interference fit shank portion 50 and the top work piece 10. The cold working delays the onset of fatigue cracking and, accordingly, increases the life of the riveted joint.

The operation of the present invention will now be described with reference to FIGS. 1A and 1B. As shown in FIG 1A, the work pieces 10 and 12, to be fastened together, are arranged in overlapping relation so that their holes 14, 16 are aligned. Once the work pieces 10, 12 have been aligned, the rivet 20 is positioned in the bore 18, in the manner illustrated in FIG. 1A. Specifically, the shank body portion 60 is substantially positioned within the bore 18, while the interference fit shank portion 50 is located adjacent the head countersink 19 and partially protrudes from the bore 18. Additionally, the head 22 is positioned outside of the bore 18. It will be recalled that the rivet 20 is positioned within the bore 18 with some degree of clearance between the outside of the sleeve 24 and the inside of the bore 18.

In the initial position of FIG. 1A, the stem 61 is positioned within the bore 18, so that the head 63 protrudes from the blind end 65 of the bore 18. A serrated upper portion extends through the axial bore 26 in the head 22 and protrudes from the head 22.

Once positioned, an end load is applied to the head 22 to further position the rivet 20 in the hole 18 and retain it in a relatively stationary position. That is, an end load is applied to push the rivet 20 into the bore 18 so that the head 22 at least partially engages its countersink 19 and is flush with the top sheet 19. Sufficient end load must be applied to force the interference shank portion 50 into the hole 18. It will be recalled that the interference shank portion 50 has a diameter greater than that of the hole 18. Accordingly, there is frictional resistance to the insertion of the interference fit shank portion 50 as well as dimensional mismatch, resulting in deformation of the hole 18.

As the interference fit shank portion 50 is moved into the bore 18, it at least partially engages the wall of the hole 18 and applies compressive stress to the regions of the top sheet 10 surrounding the hole 18. The compressive stress produces a degree of cold working in the top sheet 10, as indicated in FIG. 1B. The cold working increases the strength of the rivet joint, as discussed above.

As the end load is applied to the rivet 20, the stem 61 is drawn axially upwardly through the sleeve 24. It will be recalled that the head 63 of the stem 61 has a diameter greater than that of the sleeve 24. Accordingly, as will be appreciated by one skilled in the art, as the head 63 is moved through the sleeve 24, the sleeve 24 is expanded radially outwards at the distal or blind end 65. Expansion of the blind end 65 forms a blind bulbed head in accordance with known teachings.

As the stem 61 is drawn up through the axial bore 18, a sufficient end load must be applied to seat the rivet 20 securely in the bore 18 and prevent the stem force from pulling the rivet 20 out of the hole 18. In the present invention, the load applied to the working end of the rivet 20 is balanced with the load drawing the stem 61 upwardly through the sleeve 24. Specifically, the end load typically must be greater than the load pulling up on the stem 61 to deform the sleeve 24; otherwise, the stem force would pull the rivet 20 out of the hole 18.

The structure of the present invention provides a significant advantage as the sleeve 24 is deformed by the stem 61. As stated above, as the stem 61 is drawn upwardly through the sleeve 24, a bulb forms at the blind end 65 of the rivet 20. As the bulb forms, a portion of the sleeve 24 is drawn downwardly into the hole 18 as the work pieces 10, 12 move along the outside surface of the sleeve 24. Any gap between the work pieces 10, 12 is closed by movement of the work pieces 10, 12 along the sleeve 24. As the bulb forms on the blind end 65, the rivet 20 tends to be drawn downwardly into the hole 18. The relative movement of the work pieces 10, 12 along the sleeve 24 toward the head 22 and the expansion of the sleeve 24 at the blind end 65 provides additional forces pulling or drawing the rivet 20 into the hole 18 thereby further promoting engagement and seating of the interference fit shank portion 50 in the hole 18. This drawing feature of the present invention tends to reduce the load required by a robotic manipulator or work person to seat the interference fit shank portion 50 in the work piece.

The drawing feature is a function of the relative material properties of the stem 61 and sleeve 24, the degree or range of interference between the sleeve internal bore 26 and the head 63, the entry angle of the head 63, and the coefficient of friction between the sleeve 24 and the work piece 10. In a preferred embodiment of the present invention, the sleeve 24 is formed of titanium whereas the stem 61 is formed of corrosion resisting steel.

Although some end load is required to position the rivet 20 in the work piece 10 and to counteract the drawing force on the stem 61, it is preferable to have balance of loads so that only the minimum amount of end load is needed in order to result in a rivet 20 which is properly seated in the hole 18 and to produce sufficient hole-fill between the interference fit shank portion 50 and the hole 18. In other words, some degree of end load should be avoided so as not to impose unnecessary forces on the work piece 10.

Drawing of the stem 61 continues until a predetermined time at which the upper portion of the stem 61 breaks away from the head 63. The breaking leaves a portion of the stem 61 in the axial bore 26 so that the axial bore 26 is filled.

Accordingly, an improved method of blind riveting and an improved blind rivet have been described. The blind rivet of the present invention includes an interference fit shank portion which ensures that the rivet engages a bore at the head/shank juncture. Thus, adequate hole fill is ensured and the strength of the rivet joint is increased. The rivet of the present invention also introduces a degree of cold working in the region of the sheet adjacent the interference it shank portion. This delays the onset of fatigue cracking and increases the life of the rivet joint. The blind rivet of the present invention further produces a drawing effect which reduces the force necessary to seat the rivet.

What is claimed is:

1. A blind rivet including a work end and a blind end, said blind end rivet comprising:

a head;

a shank extending from said head, said shank defining first and second shank portions in a lengthwise extending sequence away from said head, said first shank portion connecting said head to said second shank portion, said first shank portion being adapted for an interference fit with a work bore and including a tapered region, said second shank portion being adapted for a clearance fit with the work bore;

an axially aligned bore extending through said head and said shank and being defined by said head and said shank; and a stem having a stem head, said stem being positioned within said axially aligned bore so that said stem head protrudes from said shank at said blind end of said rivet, said stem being displaceable within said axially aligned bore for moving said stem head into said shank, movement of said stem head into said shank expanding said shank radially outwards at said blind end of said rivet and forming a blind bulbed head at said blind end of said rivet.

2. A blind rivet according to claim 1 in which said first shank portion comprises a generally axially aligned region adapted for an interference fit with a work bore, said tapered region connecting said generally axially aligned region of said first shank portion to said second shank portion.

3. A blind rivet according to claim 1 in which substantially all of said first shank portion is tapered.

4. A blind rivet according to claim 3 in which the taper angle of said first shank portion is between approximately three and approximately 10 degrees.

5. A blind rivet according to claim 1 in which insertion of said interference fit first shank portion into a work bore compressively stresses the areas of a work piece surrounding the work bore.

6. A blind rivet according to claim 1 in which formation of said blind bulbed head draws said rivet into said work bore, and draws said first shank portion into an interference fit with said work bore.

7. A blind rivet according to claim 1 in which said shank is formed of titanium.

8. A blind rivet according to claim 1 in which said stem is formed of corrosion resisting steel.

9. A blind rivet including a work end and a blind end for fastening two work pieces together, said blind rivet comprising:
   a head;
   a shank extending from said head, said shank defining first and second shank portions in a lengthwise extending sequence away from said head, said first shank portion connecting said head to said second shank portion, said first shank portion being adapted for an interference fit with a work bore formed in said work pieces and including a tapered region, said second shank portion being adapted for a clearance fit with the work bore;
   an axially aligned bore extending through said head and said shank and being defined by said head and said shank; and
   a stem having a stem head, said stem being positioned within said axially aligned bore so that said stem head protrudes from said shank at said blind end of said rivet, said stem being displaceable within said axially aligned bore for moving said stem head into said shank, movement of said stem head into said shank expanding said shank radially outwards at said blind end of said rivet and forming a blind bulbed head at said blind end of said rivet, formation of said blind bulbed head drawing said work pieces together and closing any gaps between said work pieces.

10. A method of fastening two work pieces together using a blind rivet comprising a head, a shank including an interference-fit region and a tapered region, and a stem having a stem head and positioned within an axially aligned bore extending through said shank and said rivet head, said method comprising the steps of:
    positioning said blind rivet in a work bore formed in said work pieces so that said rivet head protrudes from said work bore and said stem head protrudes from said blind end of said rivet;
    applying an end load to said head to force said interference-fit portion into said work bore; and
    drawing said stem upwardly through said axially aligned bore to form a blind bulbed head at said blind end of said rivet while applying an end load to said rivet head substantially equal to that required to draw said stem upwardly.

11. A method of fastening two work pieces together using a blind rivet comprising a head, a shank including an interference-fit region and a tapered region, and a stem having a stem head and positioned within an axially aligned bore extending through said shank and said rivet head, said method comprising the steps of:
    positioning said blind rivet in a work bore formed in said work pieces so that said rivet head protrudes from said work bore and said stem head protrudes from said blind end of said rivet;
    applying an end load to said head to force said interference-fit portion into said work bore;
    drawing said stem upwardly through said axially aligned bore to form a blind bulbed head at said blind end of said rivet while applying a load to said rivet head; and
    drawing said work pieces together and pulling said rivet into said work bore by forming said blind bulbed head.

12. A method of fastening two work pieces together using a blind rivet comprising a head, a shank including an interference-fit region and a tapered region, and a stem having a stem head and positioned within an axially aligned bore extending through said shank and said rivet head, said method comprising the steps of:
    positioning said blind rivet in a work bore formed in said work pieces so that said rivet head protrudes from said work bore and said stem head protrudes from said blind end of said rivet;
    applying an end load to said head to force said interference-fit portion into said work bore;
    compressively stressing said work pieces by forcing said interference fit shank portion into said work bore; and
    drawing said stem upwardly through said axially aligned bore to form a blind bulbed head at said blind end of said rivet while applying a load to said rivet head.

* * * * *

UNITED STATES PATENT AND TRADEMARK OFFICE
CERTIFICATE OF CORRECTION

PATENT NO. : 6,171,038 B1  Page 1 of 1
DATED : January 9, 2001
INVENTOR(S) : John D. Pratt and Soheil Eshraghi It is certified that error appears in the above-identified patent and that said Letters Patent is hereby corrected as shown below:

Column 6,
Line 6, "work piece." should read -- work piece 10. --

Signed and Sealed this

Second Day of October, 2001

Attest:

*Nicholas P. Godici*

NICHOLAS P. GODICI
*Attesting Officer*   *Acting Director of the United States Patent and Trademark Office*